United States Patent [19]

Havens

[11] 3,976,733
[45] Aug. 24, 1976

[54] METHOD FOR THE PREPARATION OF PLASTIC ARTICLES BY EXTRUSION AND COOLING BY GAS BEARING

[75] Inventor: Carl B. Havens, Fresno, Calif.

[73] Assignee: The Dow Chemical Company, Midland, Mich.

[22] Filed: June 30, 1974

[21] Appl. No.: 474,505

Related U.S. Application Data

[63] Continuation-in-part of Ser. No. 293,825, Oct. 2, 1972, abandoned.

[52] U.S. Cl. .................................. 264/89; 264/95; 264/146; 264/210 R; 264/237; 425/72 R; 425/326 R
[51] Int. Cl.² ................... B29C 17/04; B29D 23/04
[58] Field of Search ............. 264/95, 89, 146, 209, 264/210 R, 237, 348; 425/326 R, 72

[56] References Cited
UNITED STATES PATENTS

| | | | |
|---|---|---|---|
| 2,708,772 | 5/1955 | Moncrieff | 264/210 R |
| 2,987,767 | 6/1961 | Berry et al. | 264/95 |
| 3,090,998 | 5/1963 | Heisterkamp et al. | 264/95 |
| 3,468,995 | 9/1969 | Nelson | 264/209 |
| 3,560,600 | 2/1971 | Gliniecki | 264/209 |
| 3,803,278 | 4/1974 | Eberle et al. | 264/237 |

Primary Examiner—Jeffery R. Thurlow
Attorney, Agent, or Firm—Robert B. Ingraham

[57] ABSTRACT

Thin plastic tubes are prepared by extruding a heat plastified tube, stretching the tube over a gas bearing having a diameter greater than the diameter of the extruded tube, cooling the surface of the tube adjacent the gas bearing and passing the tube over a cooling mandrel having an outside diameter approximating the diameter of the gas bearing, thereby lowering the temperature of the tube below its heat plastifying temperature.

6 Claims, 5 Drawing Figures

METHOD FOR THE PREPARATION OF PLASTIC ARTICLES BY EXTRUSION AND COOLING BY GAS BEARING

This application is a continuation-in-part of my copending application Ser. No. 293,825 filed Oct. 2, 1972 now abandoned.

Many techniques are employed to form extrudable synthetic resinous thermoplastic compositions into film and sheet. Solutions of resins or plastics are cast on a surface, the solvent removed by evaporation either at ambient or elevated temperatures and the resultant plastic film removed from the surface. For many plastic compositions which are extrudable it is particularly desirable to extrude without solvent or at least with a minimum of volatile materials present. The two major methods for the preparation of plastic film or sheet by extrusion are tube extrusion and slot die or sheeting die extrusion. In the tube extrusion process the heat plastified material is extruded in the form of a tube usually stretched over suitable support which may be a mandrel or alternately over a trapped gas bubble. The gas bubble is usually formed between the extrusion die and nip or pinch rolls spaced from the die. With the slot extrusion process, two major varieties are employed — chill roll casting and tentering. In the chill roll casting process, the extrude from a slot or sheeting die is deposited on a cooled roll which is rotating at a surface speed in excess of the extrusion rate. Thus, the thickness of the resultant film is controlled by the thickness of the extrude, the relative speed of extrusion and the surface speed of the chill roll. Another mode of slot extrusion is the tentering process wherein a sheet is extruded, grasped by the edges by mechanical supports and stretched both in the machine direction (direction of extrusion) and in the transverse direction (in the direction of the width of the sheet). Each of the processes has advantages and disadvantages. Usually maximum control of the extrude, including stretching rate and temperature, is obtained with the tentering process. Tentering is mechanically complex and requires that a relatively large portion of the edges of the extrude be discarded as scrap. Chill roll casting is a mechanically simple process but imposes severe restriction on the so-called molecular orientation which may be introduced into the film when being prepared. The possibility of inroducing desired biaxial orientation into the film is very low. Tube extrusion processes such as mandrel extrusion and the trapped bubble process offer substantial advantages in rates of production possible, minimal edge trim and wie variations in the thickness of the product obtained. However, these processes also have disadvantages such as the occurrence of blemishes on the film due to condensation of volatiles from the extrude, dimensional variations caused by mechanical instability of the bubble or tube due to minor non-uniformities of temperature or resin composition in the extrude at relatively low extrusion rates. Such variations often can be tolerated but as the extrustion rate increases frequently such variations become intolerable for practical commercial production. Generally one process or the other is employed with benefit to provide a film having an optimum physical property, such as biaxial orientation, optical clarity, surface gloss, impact strength and the like. Often optimization of any one property is at the sacrifice of one or more of the other properties. For wide applicability of a film in the market place it is desirable that it possess the generally desirable physical properties to a relatively high degree.

It would be desirable if there were available an improved process for the extrusion of extrudable film forming synthetic resinous compositions.

It would also be desirable if there were available an improved apparatus for the extrusion of plastic film.

It would further be desirable if there were available an improved method and apparatus for the tube extrusion of plastic film wherein the film has a desired balance of physical properties.

It would also be desirable if there were available an improved method and apparatus for the tube extrusion of plastic film wherein the product was relatively insensitive to minor variations in the extrude.

These benefits and other advantages in accordance with the present invention are achieved in a method for the extrusion of a film forming extrudable thermoplastic synthetic resinous composition, the steps of the method comprising extruding a heat plastified synthetic resinous film forming composition in the form of a heat plastified tube having generally radial symmetry about the axis of the extrusion, stretching the tube and passing the tube over a generally circular gas bearing, the gas bearing having a diameter greater than the diameter of the tube as initially extruded, supplying from the gas bearing a gas at a temperature below the thermoplastic temperature of the tube, subsequently passing the tube from the gas bearing over a mandrel having a transverse dimension approximating that of the gas bearing, contacting the inner surface of the tube with an adjacent outer surface of the mandrel and maintaining the mandrel at a temperature below the thermoplastic temperature of the tube, with the further limitation that at least a major portion of the tube disposed between the extrusion orifice and the gas bearing has at least one generally frustoconical configuration.

Also contemplated within the scope of the present invention is an extrusion apparatus, the apparatus being particularly suited and adapted for the preparation of synthetic resinous thermplastic extrudable tubing, the apparatus comprising in cooperative combination a source of heat plastified synthetic resinous extrudable film forming material, an extrusion die, the die having an annular extrusion orifice, the orifice being in operative communication with said source, a generally annular gas bearing in spaced relationship to the orifice, the gas bearing being generally coaxially disposed therewith, the bearing having an outside diameter greater than the orifice, a mandrel disposed adjacent to the bearing and remote from the orifice, the mandrel having an outer surface having the general cross-sectional configuration to the cross-sectional configuration of the bearing in a plane generally normal to an axis passing generally centrally through the die, bearing and mandrel, the mandrel having in operative association therewith cooling means to maintain the outer surface of the mandrel at a temperature below the heat plastification temperature of a heat plastifiable extrudable film forming material.

A particularly advantageous embodiment of the invention includes means to force an extruded tube into contact with the outer surface of said mandrel.

Further features and advantages of the present invention will become more apparent from the following specification taken in connection with the drawing wherein.

Figure 5:
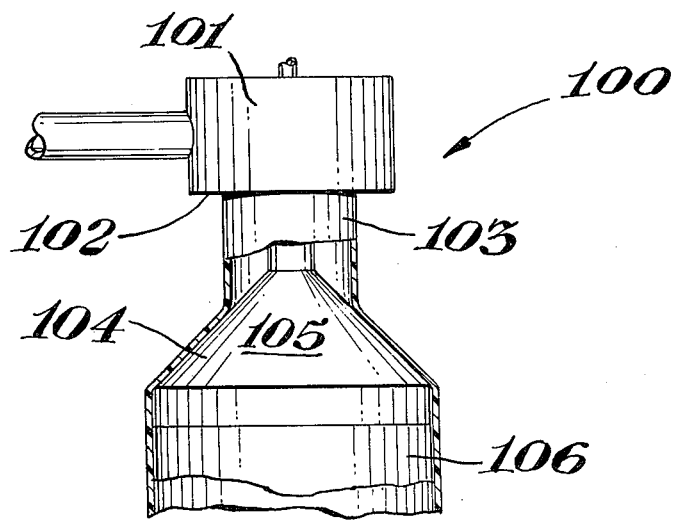

FIG. 5 schematically depicts a view of a die air bearing portion of a mandrel.

Figure 1:
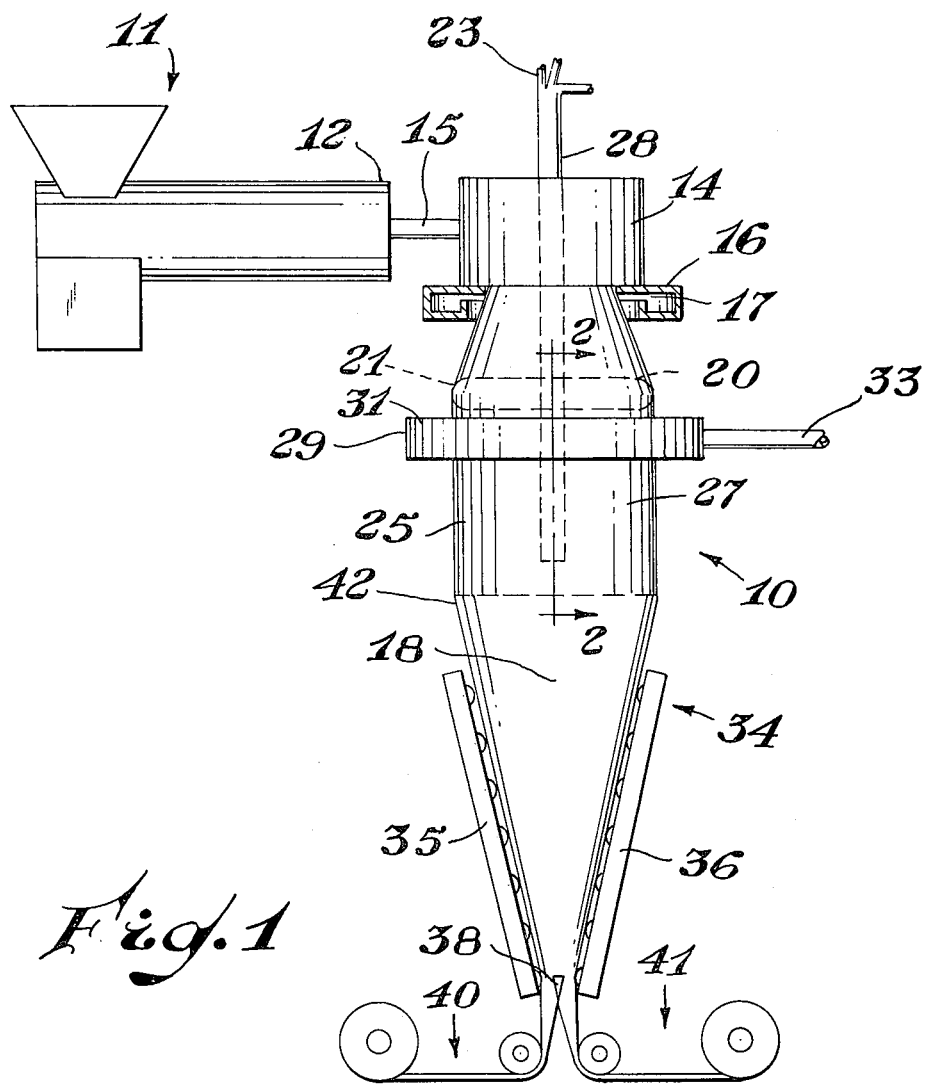
FIG. 1 is a schematic representation of the apparatus and method of the invention.

In FIG. 1 there is schematically depicted partly in section an apparatus of the present invention generally designated by the reference numeral 10. The apparatus 10 comprises in cooperative combination a source 11 of heat plastified thermoplastic film forming synthetic resinous material such as an extruder. The source 11 has a discharge end 12. A die 14 is in operative connection with the discharge end 12 of the source 11 by means of a transfer conduit 15. The die 14 defines a generally annular extrusion orifice 17 surrounded by an annular air ring 16. The air ring 16 (shown in section) provides a generally radially inward annular stream of cooling gas. The die 14 has an axis of extrusion 18 generally designated by the broken line. Adjacent to the orifice 17 is means defining a gas bearing 20. The gas bearing 20 defines a generally annular bearing surface 21 which is generally outwardly disposed and has a diameter greater than the diameter of the orifice 17. The bearing 20 is in operative communication with a source 23 of gas suitable for cooling an extrude passing thereover. Beneficially the gas bearing is in the general form of an annular conduit. A mandrel 25 is disposed generally adjacent the bearing 20 and remote from the die 14 and orifice 17. The mandrel 25 has an outer generally cylindrical surface 27 generally coaxial with and parallel to the axis of extrusion 18 and has a dimension which approximates the dimension of the bearing 20 in a plan normal to the axis of extrusion. The bearing 20 and the mandrel 25 are carried on a support and supply means 28 with cooling fluid from the source 23 to the gas bearing 20 and cooling fluid to and from the mandrel 25. The cross-sectional configuration of the bearing and mandrel in a plane normal to the axis of extrusion beneficially is circular, but if desired is generally elliptical, trilobal or the like. A tube-positioning means 29 is disposed generally adjacent to the outer surface 27 of the mandrel 25. The tube-positioning means 29 comprises a generally annular housing 31 having defined therein a generally annular plenum 32. The plenum 32 is in operative combination with a gas source 33 which provides gas under pressure and at a desired temperature. The housing 31 defines a generally annular radially inwardly disposed passage 32a which terminates remote from the plenum 32 in a radially inwardly discharging orifice 33a at a location generally adjacent to the outer surface 27 of the mandrel 25. The tube-positioning means provides a generally planiform blast of gas, such as air, which serves to force the tube toward the outer surface 27 of the mandrel 25. A tube collapsing means 34 is disposed generally along the axis of extrusion and comprises a first collapsing rack 35 and a second oppositely disposed collapsing rack 36. A slitting means 38 is disposed adjacent the conjunction of the racks 35 and 36. First and second windup means 40 and 41 are positioned adjacent the collapsing means 34 remote from the die 14. An extruded tube 42 is shown emerging from the die 14 and passing over the bearing 20 and the mandrel 25 being slit and wound.

Figure 2:
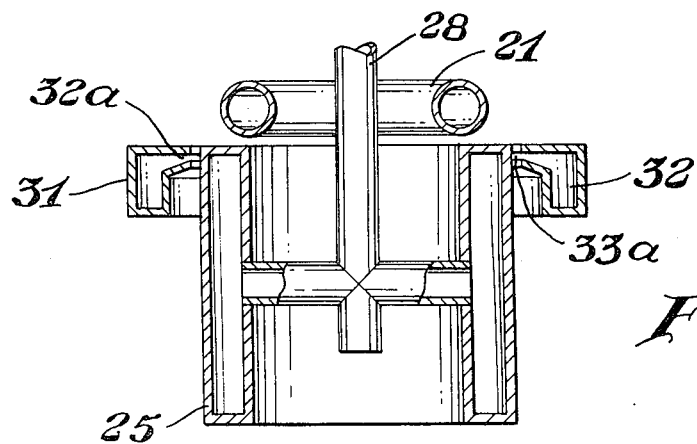
FIG. 2 is a sectional representation of the apparatus of FIG. 1 taken along the line 2-2 thereof.

In FIG. 2 there is schematically depicted a sectional view of the apparatus 10 taken along the line 2—2 of FIG. 1 which more clearly discloses the relationship of the bearing 20, mandrel 25, tube-positioning means 29 and a support and supply means 28 passing through the die 14.

In operation of the apparatus and practice of the method of the present invention, heat plastified film forming extrudable synthetic resinous material is provided by the source 11, passed to the die 14 and is extruded from the orifice 17 as a generally annular tube 42. The tube 42 is distended and passed over the bearing 20. Between the tube-positioning means 29 and the mandrel 25, the positioning means provides a cooling, generally planiform inwardly directed gas stream onto the tube forcing it into contact with the outer surface 27 of the mandrel 25. Effective rapid cooling of the stretched tube is provided by three sources - the bearing, the positioning means and by the mandrel. By controlling temperatures of these three elements, the cooling rate of the extruded film or tube is readily controlled within wide limits. Beneficially in practice of the method of the present invention, the portion of the tube extending between the extrusion orifice 17 and the bearing 20 is maintained in a generally frustonconical configuration by maintaining the gas pressure inside and outside the extruded tube at generally equal pressures. This is readily accomplished by the use of a hollow mandrel and/or venting through the center of the die. It is essential that the space enclosed by the extruded tube be vented in order to prevent inflation of the tube and to permit it to conform to the mandrel. A slight positive or negative pressure may be tolerated within the tube, however the pressure differential should not be sufficiently large to cause significant distortion of the tube configuration. The gas flow required by the air or gas bearing must be permitted to flow freely from the space within the tube. Undue restriction of this flow can result in the formation of unsightly blemishes on the extruded tube when volatile materials are present in the composition being extruded; for example, residual glycol in polyethylene.

Figure 3:
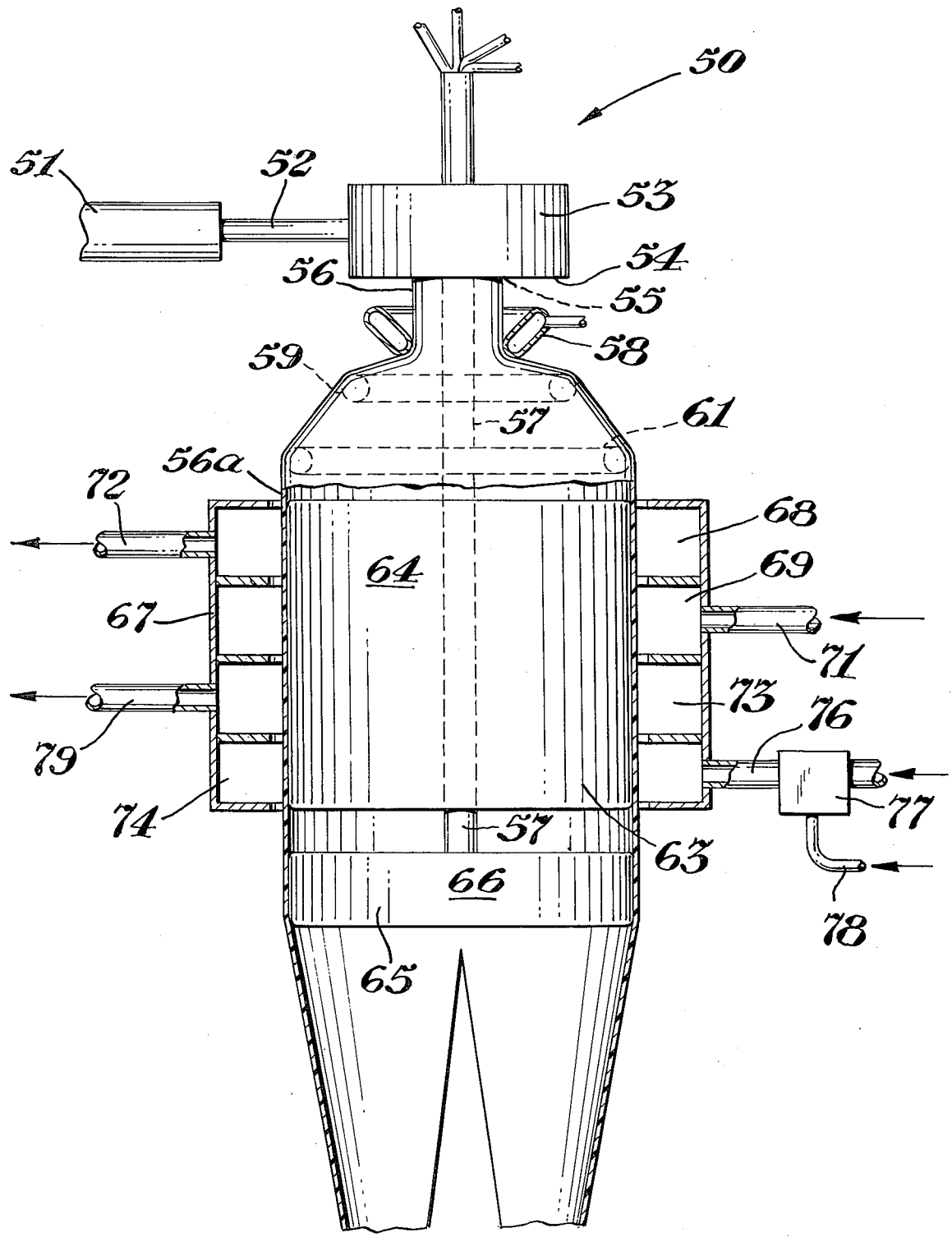
FIG. 3 is a schematic partly in-section view of an alternate embodiment of the apparatus of the present invention.

In FIG. 3 there is schematically depicted a fractional view of an alternate embodiment of the invention generally designated by the reference numeral 50. The apparatus 50 comprises in cooperative combination a source 51 of heat plastified extrudable film forming material. The source 51 is in full communication with a conduit 52 which in turn communicates with an annular die 53. The die 53 has a die face 54 having defined therein an annular extrusion orifice 55. A heat plastified synthetic resinous tube 56 is issuing from the orifice 55. A support and supply means 57 extends generally centrally through the die and provides communication for heat exchange fluids such as liquids and gases. A first gas bearing 58 is disposed generally adjacent the die face 54. The gas bearing 58 is of generally annular configuration and has an annular convex surface 58a having a diameter approximating that of the extrusion orifice 55. The gas bearing 58 is in communication with a source of compressed gas, not shown. A second gas bearing 59 is disposed adjacent the first gas baring 58 and remote from the die 53. The second gas bearing 59 is supported and supplied with gas by the support means 57. The gas bearing 59 is of generally toroidal configuration and has a diameter larger than that of the surface 58a of the first gas bearing 58. A third gas bearing 61 also of generally toroidal configuration is disposed adjacent the second gas bearing 59 and remote from the first gas bearing 58. The third gas bearing 61 is also supported by the support means 57 and receives a gas supply therefrom. Adjacent the third gas bearing 61 is disposed a generally cylindrical mandrel 63 also supported on the support 57. The cylindrical mandrel 63 has an external diameter which approximates that of the gs bearing 61. The die 53, gas bearings 58, 59, 61 and the mandrel 63 are generally coaxially arranged. The mandrel 63 is supported by the support means 57 and receives heat exchange fluid such as a cooling liquid through the support 57. The mandrel 63 has an external cylindrical surface 64. Disposed generally adjacent the mandrel 63 is a second mandrel 65 also supported on the support means 57. The mandrel 65 has an external cylindrical surface 66 in spaced relationship to the surface 64. The second mandrel 65 has at least one heating means, such as electrical resistance heaters or heat exchange fluid such as oil circulating therethrough and the surfaces 64 and 66 are generally coaxially disposed. A hollow housing 67 is disposed generally coaxially about the surface 64 of the mandrel 63. The housing 67 defines a first inwardly opening annular recess or plenum chamber 68 immediately adjacent a second similar chamber 69. The chamber 69 is in operative communication with a gas supply means 71 while the chamber 68 is provided with a gas outlet 72. A third inwardly facing annular groove or chamber 73 is defined by the housing 67 and is disposed generally adjacent the groove 69 and remote from the groove 68. A fourth inwardly facing annular groove or plenum chamber 74 is disposed adjacent the plenum 73 and remote from the plenum chamber 69. The groove 64 is in full communication with a gas source 75 having disposed therein a liquid spray chamber 77. The liquid spray chamber is in operative communication with a liquid supply means 78. The chamber 73 has an exit conduit 79. The tube 56 passes within the first gas bearing 58 over the second gas bearing 59 and is further stretched over the third gas bearing 69 and is passed over the surface of the mandrel 64 as the tube 56a. The tube 56a is then passed over the surface 66 of the second mandrel 65, slit and wound or processed as desired.

The embodiment depicted in FIG. 3 permits excellent control of film characteristics in that the three air bearings are employed to support and/or heat or cool the extruded film as desired, depending upon the particular physical properties desired in the finished film. For example, in the preparation of polyethylene, a film with a very low tendency to block may be obtained if the film is cooled while stretching in the region of the air bearings and such a film has a tendency to be hazy. However, if a high gloss film is desired which has a high tendency to block; that is, to adhere to itself on standing under ambient conditions, heated gas is provided to the gas bearings and the film rapidly cooled in the region of the cylindrical surface 64 of the mandrel 63. By supplying chilled air to the grooves 68 and 69 of the housing 67, the tube 56a is generally uniformly forced toward the surface 64 and the rate of heat transfer in this region increased over that obtainable with apparatus such as that depicted in FIG. 1.

Further desirable tubes can be obtained by supplying chilled air to the groove 74 which in turn flows to the groove 73. Desirably a small quantity of a liquid such as water is atomized and fed into the air stream which further increases the amount of heat which can be removed as the film passes over the mandrel 63. The arrangement of the housing 67 permits generally axial flow of the heat transfer gas over the portion of the housing extending between the plenum chambers 68 and 69. Similar flow phenomenon occurs between the plenum chambers 73 and 74. Gas forced into the plenum 74 and in turn into the plenum 73 also serves to force the film or tube 56a against the surface of the mandrel and provides added heat transfer. Once the film has been cooled in the region of the mandrel 63, advantageously it is passed over the mandrel 65, and in many instances it is desired to rapidly heat a portion of the tube adjacent one surface in order to promote crystallization of the polymer, or in some instances promote the blooming of a slip agent; that is, the migration of a slip agent or other additive within the polymer within the surface which is frequently induced by heat. Thus, employing the embodiment of FIG. 3, very close control of the film characteristics can be achieved.

Figure 4:
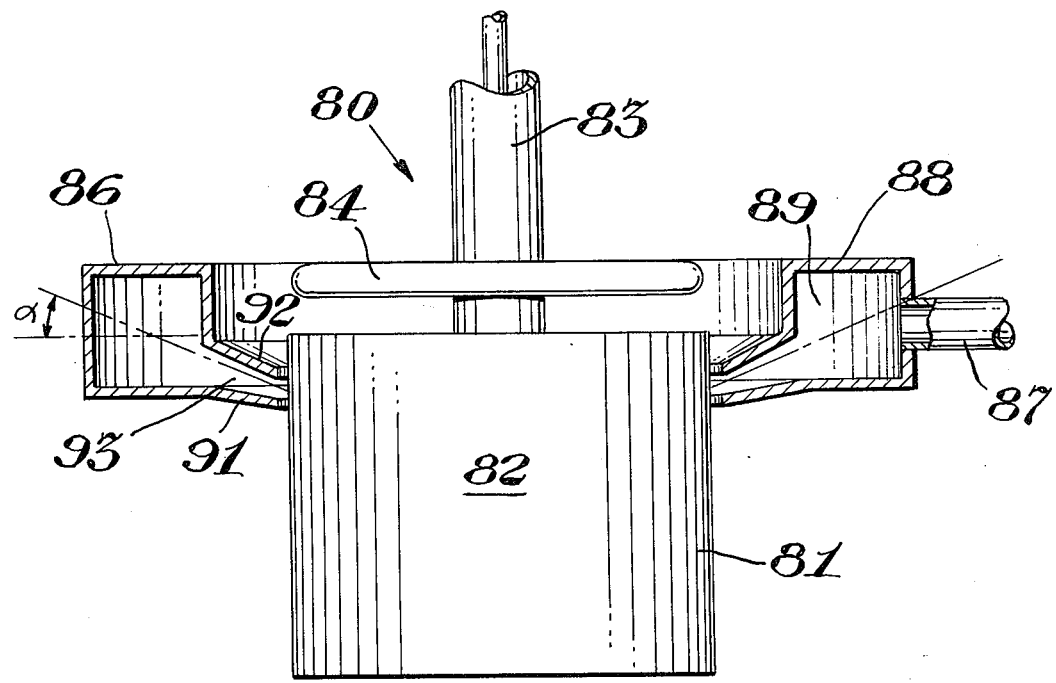
FIG. 4 is a sectional view of an alternate embodiment of the invention.

In FIG. 4, there is schematically depicted a fractional view of an alternate embodiment of the present invention generally designated by the reference numeral 80. The assembly 80 is generally equivalent to the mandrel 25 and the tube positioning means 29 depicted in FIG. 1 and in an alternate embodiment of the invention, the mandrel 25 and the tube positioning means at 29 are replaced by the assembly 80. The assembly 80 comprises in cooperative combination a generally cylindrical mandrel 81 having an exterior of film contacting surface 82. The mandrel 81 is coaxially supported upon a conduit and support means 83 affixed to an extrusion die not shown. An annular gas bearing 84 is supported by the mandrel in fixed space relationship to the mandrel 81, the bearing 84 is disposed between the mandrel 81 and the die not shown. The bearing 84 is generally coaxially disposed relative to the mandrel 81. A generally annular cooling fluid supply means 86 is disposed generally adjacent and coaxial with the mandrel 81 at location adjacent the bearing 84. The supply means 86 comprises a cooling fluid source 87, an annular housing 88 and a support means now shown. The annular housing 88 has defined therein a plenum or chamber 89 in full communication with the source 87. The housing 88 defines a first or lower annular flange 91 and a second or upper annular flange 92. The flanges 91 and 92 are in fixed space apart relationship and define therebetween a generally frustoconical annular passage 93. The passage 93 provides full communication between the plenum 89 and space external to the housing 88. When cooling fluid enters the plenum 89 from the source 27, it is discharged through the passage at 23 in an inwardly converging generally frustonconical configuration, the stream converging away from the extrusion die. Center lines are shown in the passageway 93 and are inclined to a plane extending normally to the direction of extrusion at an angle $\alpha$. The angle $\alpha$ may be from 0°–45°, however, an angle of about 20° ± 5° appears to be optimum for most film. Usually a spacng between the lips 91 and 92 at location adjacent the mandrel 81 of about ⅛ of an inch is desirable for most film extrusion operations. The space between the mandrel 81 and the adjacent flanges or lips 91 and 92 for most film extrusion vary between ⅛ of an inch to about ½ of an inch and an optimum distance appears to be about 3/16 of an inch.

The embodiment of FIG. 4 is particularly desirable when maximum use of external cooling fluid is desired with minimal equipment and "string-up" or "thread-up" difficulty.

In FIG. 5 there is schematically depicted a fractional view of an alternate embodiment of the invention designated by the reference numeral 100. The embodiment 100 comprises an annular extrusion die 101. The die 101 has an extrusion face 102 having defined therein an annular extrusion orifice (not shown). An extruded plastic tube 103 is shown issuing from the extrusion orifice (not shown). A porous fructoconical mandrel 104 is supported from the extrusion face 102 of the die 101. The mandrel 104 has minimal diameter adjacent the extrusion orifice and maximum diameter remote from the extrusion orifice, that is, the outer surface of the mandrel is convergent toward the extrusion orifice. The mandrel 104 is coaxially disposed relative to the annular tube extrusion orifice. The mandrel 104 has a gas or fluid permeable face 105 which has a frustoconical configuration depicted in FIG. 5, the tube 103 follows the face 105 until it is supported by a mandrel 106, mandrel 106 having a generally cylindrical configuration. The embodiment depicted in FIG. 5 is particularly advantageous when high melt index resins are being processed into film. Generally such high melt index resins have low melt strength and the porous frustoconical cone conveniently supports the low strength tube as it is stretched and tube rupture is minimized.

The apparatus of the invention is beneficially constructed of materials appropriate for the material being extruded, such as steel with polystyrene, polyethylene, corrosion resistant nickel alloys for polyvinylchloride and vinylidene chloride polymers. Selection of suitable materials is well within the skill of those who would desire the improvements offered by the present invention. The gas bearing is of sintered metal, porous ceramic, perforated metal or the like. However, for most applications and to insure scar- and generally scrap-free film or tube, it is desirable to utilize a porous bearing material such as ceramic, plastic or metal which allows a relatively small gas flow and high pressure drop across the porous material. Such an arrangement permits maximum variation in the extruded tube and minimum contact of the bearing surface with the tube. Such principles are well known in the art of film handling using gas bearings or air slip equipment. The mandrel beneficially is of a suitable heat conducting metal such as aluminum, steel, nickel, copper or the like with a relatively smooth outer surface. The smoothness of the outer surface in part determines the surface quality of the film passed thereover. A particularly useful surface is a fine matte chrome plate impregnated with polytetrafluoroethylene commercially available under the trade designation of "Tefchrome".

The method and apparatus of the present invention are employed with benefit using any extrudable film forming synthetic resinous composition that is extrudable into film by a tube extrusion process. Such materials are well known to those in the field to which this invention pertains. Among the better known extrudable film forming compositions are those compositions of styrene polymers including polystyrene acrylonitrile, butadiene/styrene resins, styrene/acrylonitrile resins, polyolefin resins including polyethylene, polypropylene, resinouus polymers of ethylene and proplyene, polymers of ethylene and/or propylene with other monomers such as vinylacetate and/or acrylic acid, polyvinylchloride, vinylidene chloride polymers such as a copolymer of 85 parts of weight vinylidene chloride and 15 parts by weight vinyl chloride, extrudable polyesters and the like. Such polymeric compositions may contain, if desired, such usual additives as plasticizer pigments, dyes, heat and light stabilizers, slip agents, antimicrobial agents and other additives which are desired in such film forming compositions.

The following example serves to illustrate the invention but should not be construed as limiting.

An extrusion apparatus arrangement is provided generally as depicted in FIGS. 1 and 2. The extruder has a nominal diameter of 4.5 inches and is fitted with an annular tubing die having an annular extrusion orifice of about 12 inches in diameter. A toroidal gas bearing is provided having an outside diameter of about 25.5 inches. The bearing is formed of a sintered nickel tube having a tube diameter of 2.5 inches. The gas bearing is supported by a bracket depending from the die face encircled by the extrusion orifice. Chilled air is fed to the gas bearing through a conduit attached to the bracket. A mandrel 25.5 inches in diameter is supported by the bracket adjacent the bearing and remote from the die. The mandrel has a chrome-plated, polytetrafluoroethylene-impregnated external cylindrical surface. The mandrel is water-cooled by passing water therethrough at a temperature of 65°F. Air is provided to the gas bearing at a temperature of about 70°F. Polyethylene having a density of about 0.920 gram per cubic centimeter is extruded from the annular extrusion orifice, the tube stretched over the gas bearing and mandrel and passed to the collapsing and windup section. An annular air knife is positioned about the mandrel adjacent the gas bearing. The air knife or tube-positioning means has an inner lip diameter of 26.5 inches, a lip gap of 0.015 inch and is provided with chilled air at a temperature of 70°F. The temperature of the die is about 350°F. and the extrusion rate is about 360 pounds per hour of 0.0015 inch thick polyethylene film of excellent clarity, blemish free, high impact value and has a high gloss surface.

For purposes of comparison, the same extruder and die combinations are used to produce polyethylene film by the trapped bubble process utilizing a cooler supported on the die which has a gas-liquid heat exchanger wherein the gas within the bubble is rapidly circulated over the liquid-cooled heat exchanger. Maximum optimum extrusion rate obtained is 190 pounds per hour; however, inferior film is prepared. When the gas-liquid heat exchanger is removed, optimum conditions provide 150 pounds per hour of inferior film.

In a manner similar to the foregoing illustration, similar benefits are achieved when the apparatus and method of the present invention are employed with other film forming extrudable synthetic resinous compositions.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A method for the extrusion of a film forming extrudable thermoplastic synthetic resinous composition, the steps of the method comprising extruding a heat plastified synthetic resinous film forming composition in the form of a heat plastified tube having generally radial symmetry about the axis of the extrusion, biaxially stretching the tube and passing the tube over a generally circular gas bearing having a gas permeable face, the tube being disposed over at least a portion of the gas permeable face, the gas bearing having a diameter greater than the diameter of the tube as initially extruded thereby increasing the diameter of the tube, supplying from the gas permeable face of the gas bearing a gas at a temperature below the thermoplastic temperature of the tube to thereby cool the tube, subsequently passing the tube from the gas bearing over a mandrel having a transverse dimension approximating that of the gas bearing, contacting the inner surface of the tube with an adjacent outer surface of the mandrel to thereby cool the tube and maintaining the mandrel at a temperature below the thermoplastic temperature of the tube, with the further limitation that at least a major portion of the tube disposed between the extrusion orifice and the gas bearing has at least one generally fructoconical configuration including the step of maintaining the gas pressure between the die and the gas bearing about equal to the pressure external to the extruded tube to thereby provide a generally blemish free tubular film.

2. The method of claim 1 including providing an annular inwardly flowing gas stream about the mandrel adjacent the tube and remote from the mandrel.

3. The method of claim 1 wherein the synthetic resinous composition is polyethylene.

4. The method of claim 1 wherein the gas bearing has a generally circular cross-sectional configuration in a plane normal to the axis of extrusion.

5. A method for the extrusion of a film forming extrudable thermoplastic synthetic resinous composition, the steps of the method comprising, extruding a heat plastified synthetic resinous film forming composition in the form of a heat plastified tube having generally radial symmetry about the axis of the extrusion, biaxially stretching the tube by passing the tube over a generally circular gas bearing having a gas permeable face through which gas is flowing to thereby support the tube, the gas bearing having a diameter greater than the diameter of the tube as initially extruded, supplying from the gas bearing a gas at a temperature below the thermoplastic temperature of the tube to cool the tube, subsequently passing the tube from the gas bearing over a mandrel having a transverse dimension approximating that of the gas bearing, contacting the inner surface of the tube with an adjacent outer surface of the mandrel and maintaining the mandrel at a temperature below the thermoplastic temperature of the tube, with the further limitation that at least a major portion of the tube disposed between the extrusion orifice and the gas bearing has a generally frustoconical configuration.

6. A method for the extrusion of a film of polyethylene, the steps of the method comprising, extruding a heat plastified polyethylene film forming composition in the form of a heat plastified tube having generally radial symmetry about the axis of the extrusion, stretching the tube and passing the tube over a generally circular gas bearing, the gas bearing having a gas permeable face passing gas through the gas permeable face to thereby support the tube, the gas having a temperature less than the temperature of the tube and thereby cooling the tube, the gas bearing having a diameter greater than the diameter of the tube as initially extruded, the gas bearing having a generally circular cross-sectional configuration in a plane normal to the axis of extrusion, supplying from the gas bearing a gas at a temperature below the thermoplastic temperature of the tube while maintaining the gas pressure between the die and the gas bearing about equal to the pressure external to the extruded tube, subsequently passing the tube from the gas bearing over a mandrel having a transverse dimension approximating that of the gas bearing, conmtacting the inner surface of the tube with an adjacent outer surface of the mandrel and maintaining the mandrel at a temperature below the thermoplastic temperature of the tube to thereby cool the tube, providing an annular inwardly flowing gas stream about the mandrel adjacent the tube and remote from the mandrel to thereby provide additional cooling for the tube, with the further limitation that at least a major portion of the tube disposed between the extrusion orifice and the gas bearing have a generally frustoconical configuration including the step of maintaining the gas pressure between the die and the gas bearing about equal to the pressure external to the extruded tube.

* * * * *